United States Patent [19]
Li et al.

[11] Patent Number: 6,002,442
[45] Date of Patent: Dec. 14, 1999

[54] METHOD AND APPARATUS FOR REDUCING FLICKERS IN VIDEO SIGNAL CONVERSIONS

[75] Inventors: Jan-Kwei Jack Li, Saratoga; Huang-Jen Chen, San Jose, both of Calif.

[73] Assignee: Aitech International Corp., Fremont, Calif.

[21] Appl. No.: 08/831,162

[22] Filed: Apr. 1, 1997

[51] Int. Cl.[6] ................................................. H04N 7/01
[52] U.S. Cl. .................... 348/447; 348/441; 348/446; 348/910
[58] Field of Search ................................. 348/447, 441, 348/446, 448, 910, 443, 459, 458; 345/154; H04N 7/01, 5/21

[56] References Cited

U.S. PATENT DOCUMENTS

| | | | |
|---|---|---|---|
| 3,832,487 | 8/1974 | Niet | 348/446 |
| 4,745,458 | 5/1988 | Hirano et al. | 348/436 |
| 4,924,315 | 5/1990 | Yamashita | 348/446 |
| 4,996,595 | 2/1991 | Naito et al. | 348/447 |
| 5,019,904 | 5/1991 | Campbell | 348/447 |
| 5,534,936 | 7/1996 | Kim | 348/448 |
| 5,742,349 | 4/1998 | Choi et al. | 348/443 |
| 5,781,241 | 7/1998 | Donovan | 348/441 |
| 5,812,203 | 9/1998 | Swan et al. | 348/446 |
| 5,815,208 | 9/1998 | Samela et al. | 348/446 |
| 5,822,008 | 10/1998 | Inoue et al. | 348/446 |
| 5,844,619 | 12/1998 | Songer | 348/447 |

*Primary Examiner*—Michael H. Lee
*Assistant Examiner*—Jean W. Désir
*Attorney, Agent, or Firm*—Joe Zheng; Silicon Valley Patent Agency

[57] ABSTRACT

The present invention discloses a system for adaptively reducing flickers in converting non-interlaced video signals to interlaced video signals. To preserve the original image quality in the non-interlaced video signals, the disclosed system examines the pixel values in at least two adjacent lines to decide if a reduction process should be turned on. If there is a need, the reduction process further examines the difference in the pixels from the adjacent lines to determine how to adjust a corresponding output to eliminate flickers in the resultant converted video signals. The adjusting means is based on an adjusting factor or the calculated difference between pixels which is further used in a function to eventually produce a converted interlaced signal with minimum visual errors.

16 Claims, 5 Drawing Sheets

METHOD AND APPARATUS FOR REDUCING FLICKERS IN VIDEO SIGNAL CONVERSIONS

FIELD OF INVENTION

The present invention relates to video signal conversions and more particularly to improved methods and apparatuses for reducing flickers in converting digitally from non-interlaced video signals to interlaced video signals.

DESCRIPTION OF THE RELATED ART

There are many applications that desire to display computer video signals from computers onto a larger, more advantageous and more pleasant regular television screen, for example, on-line presentation, computer simulations or games, and web browsing. However nearly all computers in use today output a standard non-interlace digital video format, such as 640 by 480 SuperVGA, applicable to all computer monitors while many television (TV) sets in use today expect to receive analog interlace video format, such as NTSC system in North America and Japan and PAL system in many Asian and European countries. A signal conversion from the standard non-interlace digital video format to the analog interlace video format must be carried out before computer image signals can be displayed on a regular TV screen.

The non-interlace format tends to scan a screen progressively, namely one line after another, to form a complete image frame while the interlace format completes an image frame by scanning even lines first followed by scanning odd lines. The major difference is that a computer image frame is formed with one scanning or a field while a TV image frame is formed with two scanning or two fields. To convert a non-interlace digital signal to interlace analog TV signal, a conventional implementation is to employ a multiplexer to alternatively extract even and odd lines from the computer signals followed by a digital-to-analog (D/A) conversion.

The above signal separation method works generally well for scene images. However, line Intensity alternating or swings, known as flickers, occur when there are high contrast contents in computer-based images. For example, a series of alternating black and white horizontal lines are generated as a computer image that can be satisfactorily displayed on a non-interlaced computer monitor but would be annoyingly displayed on a TV screen as one field comprising all the white lines shows for one thirties of a second and alternatively another filed comprising all the black lines shows for another one thirties of a second, such images appearing like elastic lines swinging up and down on a TV screen. Such flickers occur generally around horizontal parts of all letters and sharp contrast objects in images when displayed on regular TV screens.

There have been many efforts in the art to reduce the flickers when computer video signals are converted to regular TV signals. Both analog and digital methods have been designed and many are based on the principle of smoothing the line intensities with two or more adjacent lines to reduce the flickers. Such reduction of the flickers is in fact at the expense of sharp images. The resultant images when displayed on a TV screen appears softening, sharp edges becoming blurred edges and black or while lines becoming gray lines. The smoothing process is equivalent to spreading a high contrast signal to its neighbors, resulting in smearing effects. There is, therefore, a great need for a method and apparatus for converting computer signals to TV signals for display on regular TV screens with no smearing effects. In reality, high contrast letters or objects are not present everywhere in computer images or graphics, namely there are only a small portion in an image that needs to be taken care of. Therefore there is still another need for a signal convention method and apparatus for converting signal selectively, namely the method and apparatus are only turned on when there is a high contrast signal. In addition, the intensity levels change from objects to objects or letters, a fixed global flicker reduction may not deliver a satisfactory result, therefore, there still has been another need for a signal convention method and apparatus for converting signal adaptively, i.e. the output signal is a function of the intensity difference between two adjacent signal lines.

SUMMARY OF THE INVENTION

The present invention has been made in consideration of the above described problems. In a preferred embodiment, the present invention is a system for minimizing flickers in converting non-interlaced video signals to interlaced video signals. The system comprises at lease one FIFO line buffer to shift a line of pixels through therein and then detects a signal dissimilarity between at least two pixels, in the same vertical position and in their respective adjacent lines. The signal dissimilarity indicates if there is a very noticeable intensity difference in the pixels. If the signal dissimilarity exceeds a certain value, the signal dissimilarity after being carefully adjusted is added to the original pixel thus reduce flickers otherwise in the resultant interlaced video signals.

Accordingly, an important object of the present invention is to provide a generic system for effectively minimizing flickers in converting non-interlaced video signal to interlaced video signals;

Another object of the invention is to provide a system that is able to selectively turn on a flicker reduction process when a signal dissimilarity between signal lines exceed a certain limit in the signal conversion;

Still another object of the invention is to provide a system that minimize flickers with minimum visual errors in the signal conversion; and Other objects, together with the forgoing are attained in the exercise of the invention in the following description and resulting in the embodiment illustrated in the accompanying drawings.

PREFERRED EMBODIMENT

Description

Figure 1:
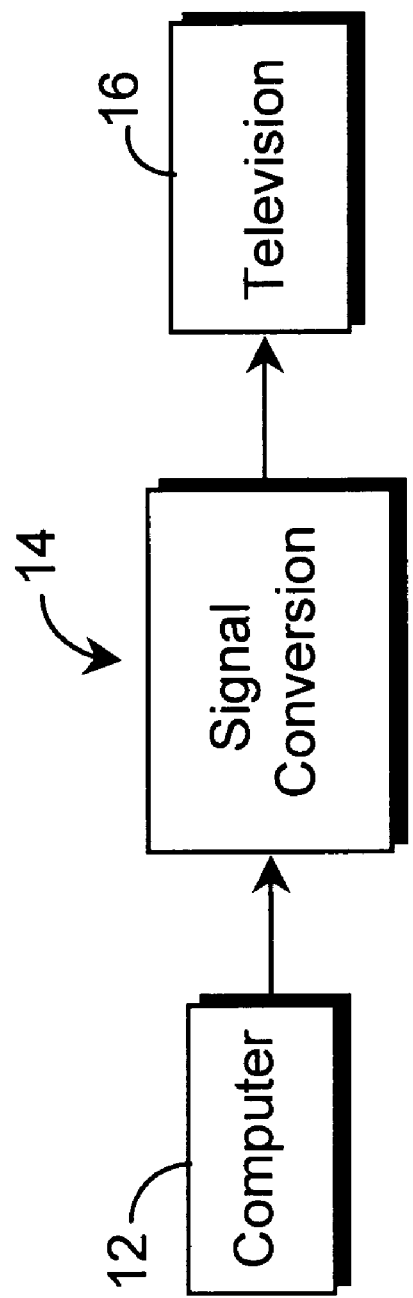
FIG. 1 depicts a configuration of the disclosed system in communication with a computer and a television.

The present invention discloses a system for adaptively reducing flickers in converting non-interlaced video signals to interlaced video signals. In a preferred embodiment, the system comprises one input to receive non-interlaced digital video signals from a computer source and one output to produce corresponding interlaced video signals applicable to televisions that have an external input to receive the interlaced video signals. Referring now to FIG. 1, there is depicted a configuration of the disclosed system 14. A computer 12 comprises a CPU and a video card such as Stealth64 Graphics Accelerator 2001 Series by Diamond Multimedia Systems, Inc. located at 2880 Junction Avenue in San Jose, Calif. 95134. Both the CPU and the video card are not necessary part of the disclosed system and not shown in the figure. The computer 12 produces the non-interlaced video signals as the output, often from the video card therein. The disclosed system 14 receives the output from the computer 12 and converts the non-interlaced video signal to the corresponding interlaced video signal. A regular television 16 in communication with the system 14 receives the converted interlaced video signals to display them thereon. It is understood to those skilled in the art that the disclosed system 14 can be embedded in the computer, hence it may be not necessary for the system 14 to receive a video signal from a video card and further the system 14 may or may not have to have a digital-to-analog converter therein depending on the input requirement of the television 16.

Figure 2:
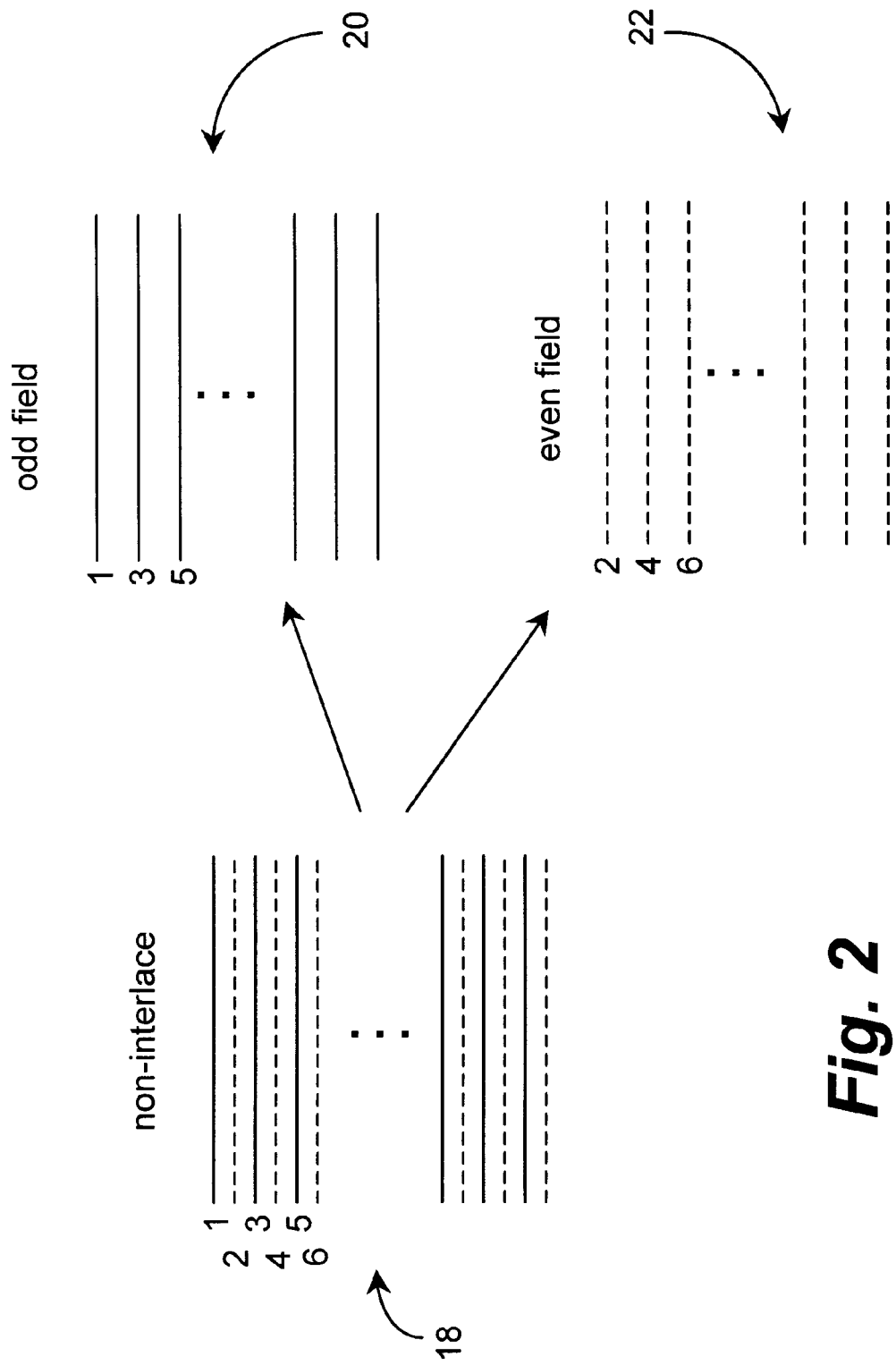
FIG. 2 shows a graphical representation of a non-interlaced video signal comprising one field being converted to a interlaced video signal comprising two fields.

Referring to FIG. 2, there shows a graphical representation of a non-interlaced video signal and the corresponding interlaced signals that the disclosed system receives and outputs, respectively. As referenced by 18, the non-interlaced video signal comprises a sequence of lines of signal, for example, 480 lines of signal for a SuperVGA signal. Each of the lines is represented by a number of pixels such as 640 pixels. In other words, the non-interlaced video signal can be viewed as a representation of an array of pixels, each pixel is a light energy intensity or intensity level. A graphics or an image is therefore represented by varying the pixel intensities, for example, a cluster of pixels being zero values is a representation of a black patch or a sequence of pixels being 255 is a representation of a white trace or line provided the representation is in 8-bit range. The non-interlaced signal 18 is to be converted through the disclosed system to two fields of signals, one field 20 comprising all odd lines of signals and the other field 22 comprising all even lines of signals. The composite of the two fields 20 and 22 becomes the interlaced video signal, a standard input to most of the television. As some of advanced televisions are able to receive digital signals, therefore the composite of the two fields 20 and 22 can be directly inputted to the televisions. However a D/A converting processing is needed if televisions can only receive analog signals. It is understood to those skilled in the art that such D/A converting processing has been readily available in many commercially available products and therefore the output of the disclosed system is kept digital in the sequel.

Figure 3:
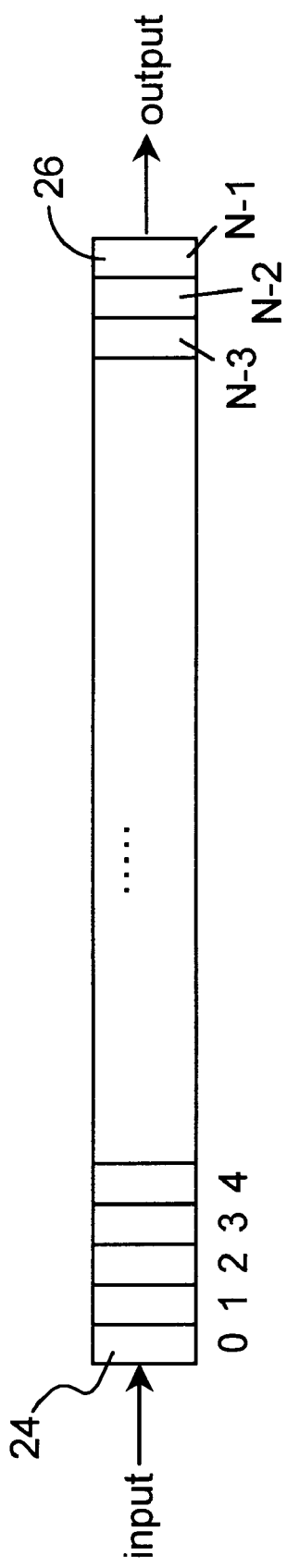
FIG. 3 demonstrates an operational representation of a FIFO line buffer used in the disclosed system.

To fully understand the disclosed system, it is necessary to understand the operation and structure of a first-in-first-out (FIFO) line buffer used therein. Referring now to FIG. 3, there illustrates a graphical representation of the FIFO line buffer. The line buffer comprises a number of cells, preferably the same number of the pixels in one line. Each of the cells stores one pixel value. If it is assumed that there are N number of pixels in one signal line, hence there are N cells in the line buffer as numbered 0, 1, 2, . . . , N−3, N−2 and N−1. When a line of pixel signal, for example $p_0$, $p_1, p_2, \ldots, p_{N-2}$, and $p_{N-1}$, is received at the input of the line buffer, the very first pixel value $p_0$ enters in the first cell indicated by 24. The subscript of the pixels $p_0, p_1, p_2, \ldots, p_{N-2}$, and $p_{N-1}$ indicates the pixel position in each line and also means the vertical or column position in the array of a pixel image therefore 0, 1, 2, . . . , N−2 or N−1 thereof is sometimes referred to as vertical or column position herein. When all the pixels $p_0, p_1, p_2, \ldots, p_{N-2}$, and $p_{N-1}$ enter in the line buffer, the first pixel $p_0$ has reached the last cell 26 of the line buffer. The time it takes to fill in the line buffer with the line signal $p_0, p_1, p_2, \ldots, p_{N-2}$, and $p_{N-1}$ is exactly the time it takes for the video card or the computer to start to output a second line, numerically about 15 to 30 microsecond depending on what format is concerned. In other words, when the first pixel $p_0$ is shifted out from the line buffer, the very first pixel of the second line is just sent out from the computer. The precise timing makes it possible for subsequent processors to perform calculations between two adjacent lines. The implementation of the line buffer is known to those skilled in the art and many forms of computer memories such as RAM are commercially available. The time is preferably guaranteed by a clocking source that synchronizes all devices in the disclosed system or a clocking source in a computer if the disclosed system is built into the computer.

Figure 4:
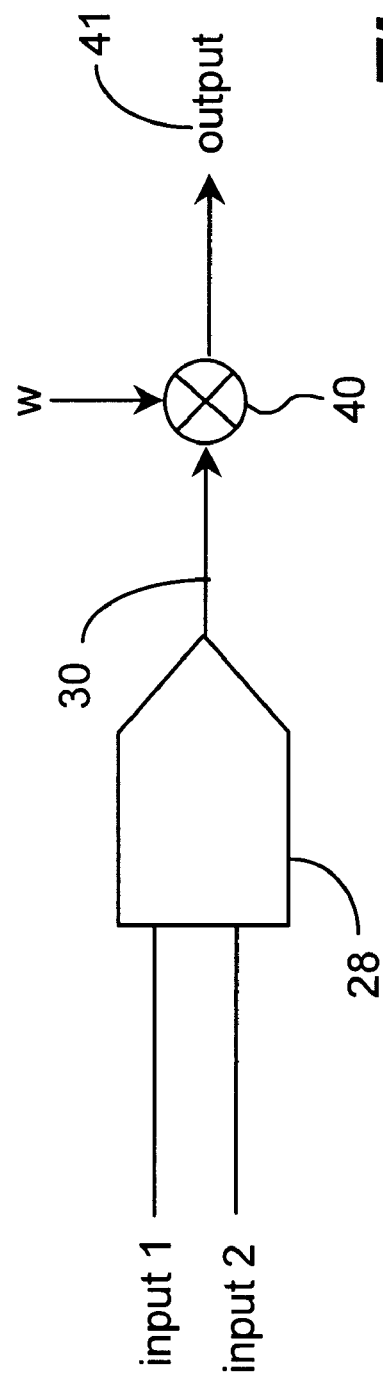
FIG. 4 shows an embodiment of modifying a difference output between two inputs by a pre-defined constant, the embodiment being part of the disclosed system.

Referring now to FIG. 4, there is shown an implementation of adaptively adjusting output signal from a pair of inputs. Indicated by 28 is means having an output 30 for comparing input 1 to input 2. For example, the comparing means is a differentiating circuit that determines the absolute magnitude (intensity) difference between the two pixels coming from the two inputs as follows:

$$\text{output} = |\text{input1} - \text{input2}|.$$

Figure 5:
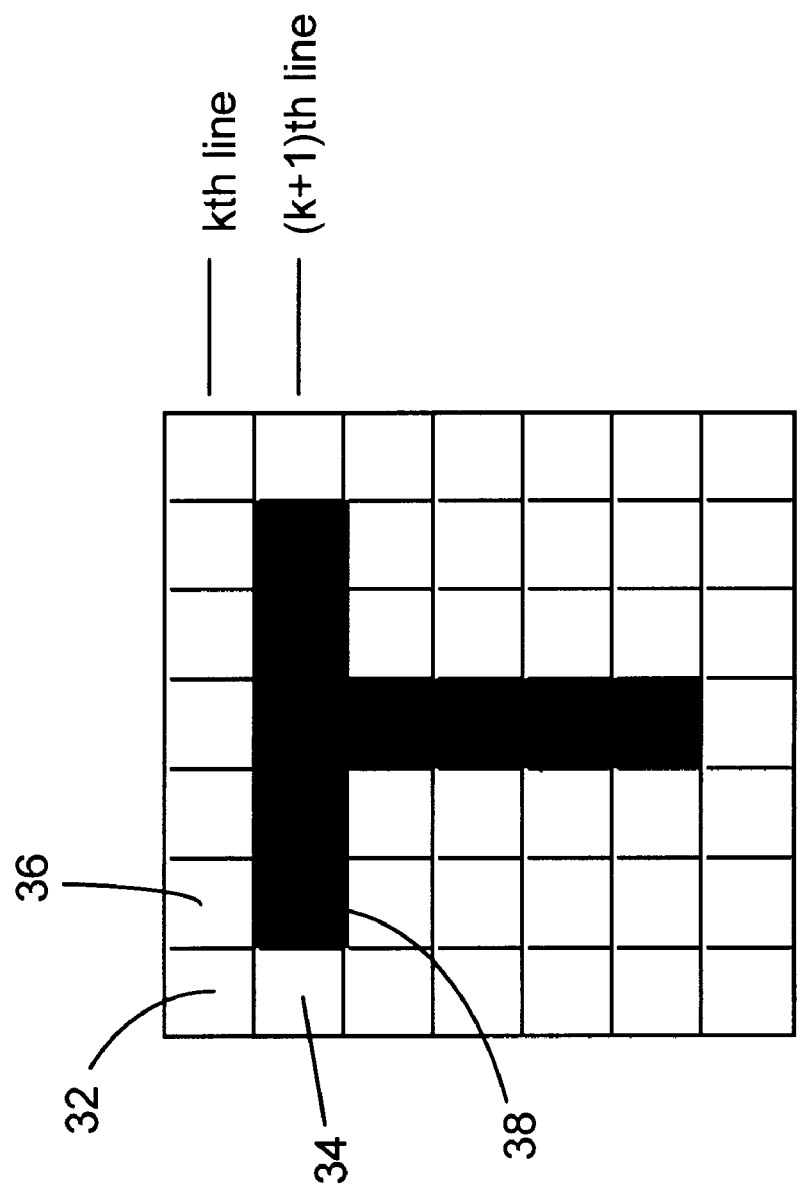
FIG. 5 depicts a graphical representation of a letter by a number of pixels.

When the difference between input 1 and input 2 is less than a certain value referred to as threshold, the output becomes zero, indicating that the two pixels have nearly the same light intensity. It should be understood that the comparing means, being part of the preferred embodiment of the disclosed system, always receives pixels from two adjacent lines and moreover the two pixels are from the same vertical positions in the two adjacent lines, a zero output means there are no high contrast in either of the pixels. If one of the pixels is part of a high contrast object or letter, the difference between the two pixels will exceed the threshold, hence a non-zero output. FIG. 5 shows an example of a small portion of a pixel array containing a letter "T" in a homogeneous background. Pixel 32 and pixel 34 are the input 1 and the input 2, respectively, each being the same vertical position in their respective lines. As both pixel 32 and pixel 34 are part of the background, the output has to be zero. When the successive inputs are pixels 36 and 38, the output must be a non-zero value. If it is assumed that the background is white represented by a pixel value 255 and the letter T is dark gray represented by a pixel value 49, the output thereof is |49−255|=206. FIG. 4 further shows the output 30 being lead to a mixing means 40 for mixing the output 30 with an adjustable constant w. The mixing means is normally being implemented by a multiplier circuit that multiplies two inputs and outputs a product thereof. The constant w is set, for example, to 0.5, the output 41 of the mixing means is a half of the output of the differentiating circuit or the output of the differentiating circuit is modulated or adjusted by the constant w. In the above example, the output 41 will be 103 resulting from 206 multiplied by 0.5. To make the output 41 adaptive to the difference signal, w can be adjusted accordingly, for example, based on a function of the difference signal as follows:

$$\text{output41} = \text{output30} \times f(\Delta p)$$

where Δp is the difference signal and $f$ is a function, such as a gamma function.

Figure 6:
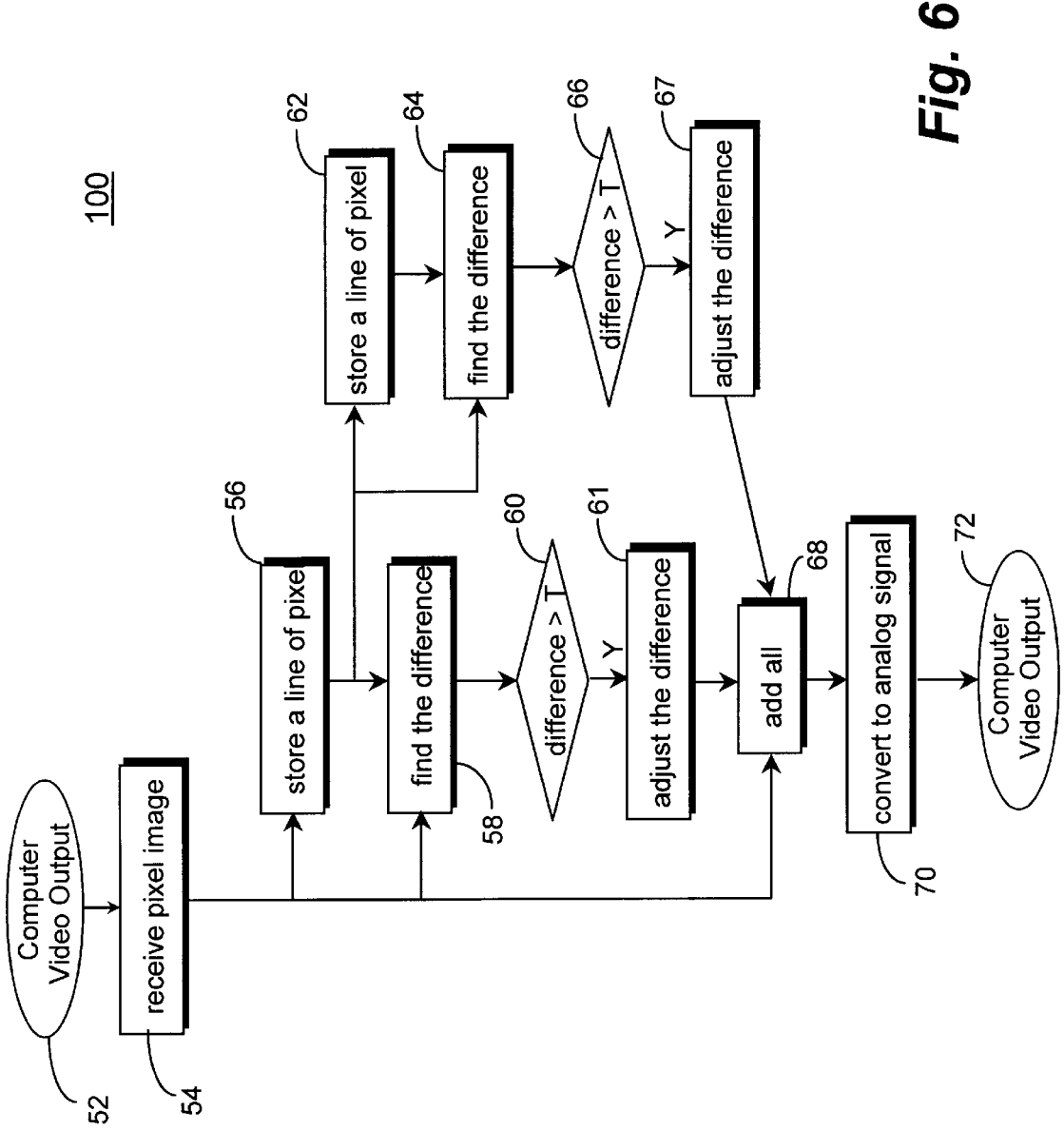
FIG. 6 illustrates the operational flow diagram of the disclosed system according to a preferred embodiment thereof.

Now referring to FIG. 6, there is shown a process flow diagram of the disclosed system 100 for reducing flickers in converting non-interlaced computer video signal to interlaced television signals according to the preferred embodiment of the present invention. Means 54 receives a non-interlaced computer video signal from a computer 52 that produces the non-interlaced computer video signal to display on a computer monitor. Means 54 is normally a video memory storing a frame of an image or an array of pixels from a computer output 52 and outputs pixels successively and line by line. Means 56 receives pixels from the means 54 and shifts the pixels into a FIFO line buffer therein. As described above when FIG. 3 is explained, when an entire line of pixels enter into the line buffer in the means 56, the first pixel of the line is just about to be shifted out. Means 58 receives two inputs or two pixels from the means 56 and means 54, respectively, namely kth pixel in nth line from the means 56 and kth pixel in (n+1)th line from the means 54 and a detection of the pixel difference between the two pixels is conducted therein and outputs the difference that is received by means 60. Means 60, as described above, is where the difference is compared to a threshold. It is understood by now that the difference can be zero or a non-zero value depending on how the difference is being compared to the threshold. If the difference is zero, indicating there is no or very little difference between the light energy of the two pixels, the means 60 outputs zero. If the difference is larger than a threshold, indicating there is significant difference between the two pixels, the means 60 outputs the difference signal. Means 61 applies an adjusting factor to the difference signal and the output of the means 61 therefore becomes an adjusted difference signal.

As indicated in FIG. 6, means 62 receives as its input the output from the means 56. Similarly to means 56, the received input is shifted successively into the FIFO line buffer in the means 62. Means 64 receives two inputs, one from the means 56 and the other from the means 62, similarly to the means 58, to determine the pixel difference between the two inputs. The difference thereof is then sent to the means 66 for comparison. Again the difference is adjusted accordingly in means 67.

It should be pointed out that the output of the means 62 is in fact a twice-delayed output of the means 54 and the output of the means 56 is the same, but once-delayed output of the means 56. From the perspective of a successive video signal from the means 54, the means 62, the means 56 and the means 54 output the same vertical pixels in three adjacent signal lines at one time. When the three outputs come to means 68 for accumulating all the inputs, the output of the means 68 can be, in general, represented by the following:

$$p_{out}(k,n)=p(k,n)+w_{-1}|p(k,n-1)-p(k,n)|+w_{+1}|p(k,n+1)-p(k,n)| \quad \text{(Eq. 1)}$$

where $p_{out}(k,n)$ is the kth pixel in nth line, $p(k,n-1)$ is the kth pixel in (n−1)th line and $p(k,n+1)$ is the kth pixel in the (n+1)th line, $w_1$ and $w_{-1}$ are an amplifying factor to modulate the corresponding outputs of the comparing means 60 and 66, respectively, provided both means 60 and 66 have an output therefrom. It is understood by now that the output of the means 61 or the means 67 can be further adaptively modified to produce an output with minimized flickers. One preferred embodiment is to apply a curve based on human visual systems to adaptively adjust the difference output to minimize the flickers with the best possible visual effects. Such curve in practice is often approximated by a gamma curve. Therefore an adaptive output $p_{out}(k,n)$ can be generically expressed in the following:

$$p_{out}(k,n)=p(k,n)+w_{-1}f(\Delta f)|p(k,n-1)-p(k,n)|+w_{+1}f(\Delta p)|p(k,n+1)-p(k,n)| \quad \text{(Eq. 2)}$$

where $f(\Delta p)$ is the adaptive adjust factor and is further defined to be zero when Δp, the difference between two pixels in two adjacent lines, is zero.

The present invention has been described in sufficient detail with one exemplary embodiment. Alternative embodiments will become apparent to those skilled in the art to which the present invention pertains without departing from its spirit and scope. For example, the above equation Eq. 2 can be further rewritten as follows:

$$p_{out}(k,n) = p(k,n) + \sum_{i=-m}^{m} w_i f(\Delta p)|p(k,n-i) - p(k,n)| \quad \text{(Eq. 3)}$$

It can be readily shown that Eq. 3 becomes Eq. 2 when m=1 and $w_0$=0. It is understood to those skilled in the art that Eq.3 is applied to more than just two adjacent lines to a current line n. For example, two previous lines, (n−2)th and (n−1)th, before a current line n, and two advancing lines (n+1)th and (n+2)th, after the current line n are considered to produce a desired output $p_{out}(k,n)$ when m=2 and $w_0$=0. Further changes and new arrangement of the equation may be made by those skilled in the art without departing from the principle and scope of the invention. Accordingly, the scope of the present invention is defined by the appended claims rather than the forgoing description of one embodiment.

What is claimed is:

1. A method for reducing flickers in transforming non-interlaced video signals to interlaced video signals, each of the video signals comprising a plurality of lines of signals, each of the line signal comprising pixels, the method comprising the steps of:

(a) receiving the pixel image in a memory;

(b) outputting the pixels successively and line by line;

(c) shifting the pixels received from step (b) into a first FIFO line buffer;

(d) receiving a kth pixel of a (n+1)th line signal from the first FIFO line buffer as a reference pixel;

(e) receiving a kth pixel of the nth line from step (b) as a determining pixel;

(f) comparing the reference pixel with the determining pixel;

(g) detecting a first dissimilarity value between the reference pixel and the determining pixel in accordance with the comparison in step (f);

(h) employing a first adjustable factor;

(i) adjusting the first dissimilarity value with the first adjustable factor;

(j) adding the adjusted first dissimilarity value obtained in step (i) to the determining pixel; and (k) outputting a first new determining pixel resulting from step (j).

2. The method as recited in claim 1 further comprising the steps of:

(l) shifting the pixels received from step (c) into a second FIFO line buffer;

(m) receiving a kth pixel of a (n−1)th line signal from the second FIFO line buffer as an advancing pixel;

(n) comparing the advancing pixel with the determining pixel;

(o) detecting a second dissimilarity value between the advancing pixel and the determining pixel in accordance with the comparison in step (n);

(p) employing a second adjustable factor;

(q) adjusting the second dissimilarity value with the second adjustable factor;

(r) adding the adjusted second dissimilarity value obtained in step (q) to the determining pixel; and (s) outputting a second new determining pixel resulting from step (r).

3. The method as recited in claim 2, wherein step (g) comprises the steps of:

subtracting the reference pixel from the determining pixel;

obtaining a first absolute value in accordance with the subtraction in the step of subtracting the reference pixel from the determining pixel; and producing the first dissimilarity value if the first absolute value is greater than a threshold.

4. The method as recited in claim 3, wherein step (n) comprises the steps of:

subtracting the advancing pixel from the determining pixel;

obtaining a second absolute value in accordance with the subtraction in the step of subtracting the advancing pixel from the determining pixel; and producing the second dissimilarity value if the second absolute value is greater than the threshold.

5. The method as recited in claim 4 further comprising the steps of:

accumulating the first new determining pixel and the second new determining pixel; and adding to the determining pixel the accumulated value in accordance with the step of accumulating the first new determining pixel and the second new determining pixel so as to produce a new kth pixel of the nth line.

6. The method as recited in claim 2, wherein step (i) comprises:

receiving the first dissimilarity value; and multiplying the first dissimilarity value with the first adjustable factor, wherein the first adjustable factor is a function of the first dissimilarity value.

7. The method as recited in claim 6, wherein step (p) comprises:

receiving the second dissimilarity value; and multiplying the second dissimilarity value with the second adjustable factor, wherein the second adjustable factor is a function of the second dissimilarity value.

8. A method for reducing flickers in transforming non-interlaced video signals to interlaced video signals, each of the video signals comprising a plurality of lines of signals, each of the line signal comprising pixels, the method comprising the steps of:

(a) receiving the pixel image in a memory;

(b) outputting the pixels successively and line by line;

(c) shifting the pixels received from step (b) successively into 2N line buffers, each of the 2N line buffers having an input and an output and being connected in series, each of the 2N buffers being defined as ith line buffer, where i is defined in a range from 1 to N, and each of the 2N buffers receiving the pixels shifted out from a predecessor thereof;

(d) receiving a kth pixel of a nth line, as a current pixel, from the Nth line buffers in accordance with step (c);

(e) receiving a kth pixel of a (n+1)th line, as an advancing pixel, from the (N+i)th line buffer in accordance with step (c);

(f) receiving a kth pixel of a (n−1)th line, as a previous pixel, from the (N−i)th line buffer in accordance with step (c);

(g) comparing the previous pixel with the current pixel;

(h) comparing the current pixel with the next pixel;

(i) detecting a first dissimilarity value between the previous pixel and the current pixel in accordance with the comparison in step (g);

(j) detecting a second dissimilarity value between the current pixel and the next pixel in accordance with the comparison in step (i);

(k) employing a first adjustable factor, wherein the first adjustable factor is a first function of the first dissimilarity value;

(l) employing a second adjustable factor, wherein the second adjustable factor is a second function of the second dissimilarity value;

(m) adjusting the first dissimilarity value with the first adjustable factor;

(n) adjusting the second dissimilarity value with the second adjustable factor;

(o) repeating step (d) to (n) N times, thereby there N pairs of the first and second dissimilarity values are generated;

(p) summarizing the adjusted first dissimilarity values and the adjusted second dissimilarity values obtained in step (o) and the pixel received from the Nth buffer line; and (q) outputting a new kth pixel resulting from step (p).

9. The method as recited in claim 8, wherein step (g) comprises the steps of:

subtracting the previous pixel from the current pixel;

obtaining a first absolute value in accordance with the subtraction in the step of subtracting the previous pixel from the current pixel; and producing the first dissimilarity value if the first absolute value is greater than a threshold.

10. The method as recited in claim 9, wherein step (h) comprises the steps of:

subtracting the next pixel from the current pixel;

obtaining a second absolute value in accordance with the subtraction in the step of subtracting the next pixel from the current pixel; and producing the second dissimilarity value if the second absolute value is greater than the threshold.

11. An apparatus for reducing flickers in transforming non-interlaced video signals to interlaced video signals, each of the video signals comprising a plurality of lines of signals, each of the line signal comprising pixels, the apparatus comprising:

a first line buffer and a second line buffer coupled in series, the first line buffer receiving the non-interlaced video signals comprising lines of signals; each of the signals comprising N pixels, the first and the second line buffers each comprising N memory cells, each of the memory cells for one of the pixels, such that the first line buffer outputs one-line delayed non-interlaced video signals and the second line buffer outputs two-line delayed non-interlaced video signals;

a first and a second comparing circuits, each having a first input and a second input, the first and the second inputs of the first comparing circuit receiving the non-interlaced video signals and the one-line delayed non-interlaced video signals from the first line buffer, the first comparing circuit outputting a first similarity value by comparing two kth pixels, respectively, in the non-interlaced video signals and the one-line delayed non-interlaced video signals, the first and the second inputs of the second comparing circuit receiving the one-line non-interlaced video signals from the first line buffer and the two-line delayed non-interlaced video signals from the second line buffer, the second comparing circuit outputting a second similarity value by comparing two kth pixels, respectively in the one-line non-interlaced video signals and the two-line delayed non-interlaced video signals; and a first and second multiplying circuits, each respectively coupled to the first and second comparing circuits, multiplying, respectively, the first similarity value by a first adjustable factor to produce an adjusted first similarity value and the second similarity value by a second adjustable factor to produce an adjusted second similarity value.

12. The apparatus as recited in claim 11, further comprising:

an adding circuit, coupled to the first and second multiplying circuits respectively, to add both of the adjusted first and second similarity values to the kth pixel of the non-interlaced video signals.

13. The apparatus as recited in claim 12, wherein the two kth pixels, respectively, in the non-interlaced video signals and the one-line delayed non-interlaced video signals are a line of signals apart; and wherein the two kth pixels, respectively, in the one-line non-interlaced video signals and the two-line delayed non-interlaced video signals are a line of signals apart.

14. The apparatus as recited in claim 11, wherein the first similarity value is a first difference between the two kth pixels, respectively, in the non-interlaced video signals and the one-line delayed non-interlaced video signals; and wherein the second similarity value is a second difference between the two kth pixels, respectively, in the one-line non-interlaced video signals and the two-line delayed non-interlaced video signals.

15. The apparatus as recited in claim 14, wherein each of the first adjustable factor and the second adjustable factor is a fractional number so that both of the first similarity value and the second similarity value are reduced.

16. The apparatus as recited in claim 14, wherein the first adjustable factor and the second adjustable factor are a function of the first difference and the second difference, respectively.

* * * * *